United States Patent
Wang et al.

(10) Patent No.: US 8,437,273 B2
(45) Date of Patent: May 7, 2013

(54) ALLOCATING DEMAND ACCORDING TO DEMAND WEIGHT

(75) Inventors: Xi Wang, Murphy, TX (US); Paparao Palacharla, Richardson, TX (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 889 days.

(21) Appl. No.: 12/488,921

(22) Filed: Jun. 22, 2009

(65) Prior Publication Data

US 2010/0266281 A1   Oct. 21, 2010

Related U.S. Application Data

(60) Provisional application No. 61/169,338, filed on Apr. 15, 2009.

(51) Int. Cl.
*H04L 12/28* (2006.01)
*G08C 15/00* (2006.01)
*G06F 15/173* (2006.01)

(52) U.S. Cl.
USPC ........... 370/254; 370/238; 370/250; 370/251; 370/252; 370/258; 370/222; 370/400; 370/404; 370/351; 370/401; 370/402; 709/220; 709/238; 709/239

(58) Field of Classification Search .......... 370/228–503; 709/220–239
See application file for complete search history.

(56) References Cited

U.S. PATENT DOCUMENTS

| | | | |
|---|---|---|---|
| 6,545,977 B2* | 4/2003 | Harshavardhana et al. .. | 370/222 |
| 7,075,892 B2* | 7/2006 | Grover et al. ................. | 370/238 |
| 7,466,688 B2* | 12/2008 | Alicherry et al. ............. | 370/351 |
| 7,489,638 B2* | 2/2009 | Keslassy et al. .............. | 370/238 |
| 7,529,784 B2* | 5/2009 | Kavuri et al. ........................ | 1/1 |
| 7,564,805 B1* | 7/2009 | Cortez et al. .................. | 370/255 |
| 7,580,950 B2* | 8/2009 | Kavuri et al. ........................ | 1/1 |
| 7,627,617 B2* | 12/2009 | Kavuri et al. ........................ | 1/1 |
| 7,719,962 B2* | 5/2010 | Grover et al. ................. | 370/229 |
| 7,916,657 B2* | 3/2011 | Doverspike et al. .......... | 370/252 |
| 8,010,694 B2* | 8/2011 | Doverspike et al. .......... | 709/235 |
| 2001/0012298 A1* | 8/2001 | Harshavardhana et al. .. | 370/405 |
| 2002/0071392 A1* | 6/2002 | Grover et al. ................. | 370/241 |
| 2002/0187770 A1* | 12/2002 | Grover et al. ................. | 455/403 |
| 2005/0063309 A1* | 3/2005 | Alicherry et al. ............. | 370/238 |
| 2005/0226214 A1* | 10/2005 | Keslassy et al. .............. | 370/351 |
| 2006/0274070 A1* | 12/2006 | Herman et al. ............... | 345/474 |

(Continued)

FOREIGN PATENT DOCUMENTS

JP        2010252336 A    * 11/2010

OTHER PUBLICATIONS

Olivier Goldschmidt, et al., "*The SONET Edge-Partition Problem*", Networks, vol. 41(1), pp. 13-23, 2003.

Yong Wang and Qian-Ping Gu, "*Efficient Algorithms for Traffic Grooming in SONET/WDM Networks*", Proceedings of the 2006 International Conference on Parallel Processing (ICPP'06), IEEE Computer Society, 8 pages, 2006.

*Primary Examiner* — Phirin Sam
*Assistant Examiner* — Venkatesh Haliyur
(74) *Attorney, Agent, or Firm* — Baker Botts L.L.P.

(57) ABSTRACT

According to one embodiment, allocating demand includes receiving a demand graph that describes demands of a network. One or more weights are calculated for each demand. The demands are allocated according to the weights of the demands to optimize optical line card sharing.

18 Claims, 9 Drawing Sheets

U.S. PATENT DOCUMENTS

2007/0103984 A1* 5/2007 Kavuri et al. ............ 365/185.17
2009/0185496 A1* 7/2009 Doverspike et al. .......... 370/245
2009/0185499 A1* 7/2009 Doverspike et al. .......... 370/250
2009/0187795 A1* 7/2009 Doverspike et al. ............ 714/43
2010/0214313 A1* 8/2010 Herman et al. ................ 345/593
2010/0266281 A1* 10/2010 Wang et al. ..................... 398/59

* cited by examiner

ALLOCATING DEMAND ACCORDING TO DEMAND WEIGHT

RELATED APPLICATION

This application claims benefit under 35 U.S.C. §119(e) of U.S. Provisional Application Ser. No. 61/169,338, entitled "Allocating Demand According To Demand Weight," filed Apr. 15, 2009, by Paparao Palacharla et al.

TECHNICAL FIELD

This invention relates generally to the field of network design and more specifically to allocating demand according to demand weight.

BACKGROUND

A traffic demand (such as a Time-Division Multiplexing (TDM) signal or a stream of packets) of an optical ring may have a bandwidth requirement that is less than the channel capacity of the ring. Accordingly, multiple traffic demands can be aggregated into a ring to improve bandwidth utilization efficiency.

An optical line card has an add-drop-multiplexer that can aggregate multiple traffic demands. A demand utilizes a pair of optical line cards, one at the source node and the other at the destination node of the demand. Sharing these optical line cards with other demands may reduce the total number of optical line cards used.

SUMMARY OF THE DISCLOSURE

In accordance with the present invention, disadvantages and problems associated with previous techniques for allocating demand may be reduced or eliminated.

According to one embodiment, allocating demand includes receiving a demand graph that describes demands of a network. One or more weights are calculated for each demand. The demands are allocated according to the weights of the demands to optimize optical line card sharing.

Certain embodiments of the invention may provide one or more technical advantages. A technical advantage of one embodiment may be that demands are allocated according to demand weights, such as location weights (LWs) and connectivity weights (CWs). This allocation technique minimizes optical line card usage for a given set of demands, which may reduce equipment cost.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7B of the drawings, like numerals being used for like and corresponding parts of the various drawings.

Figure 1:
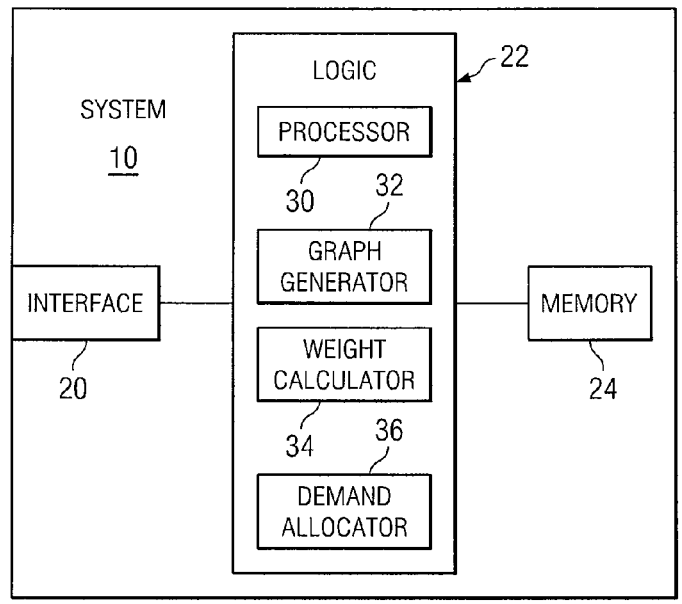
FIG. 1 illustrates one embodiment of a system configured to allocate demand according to demand weight.

FIG. 1 illustrates one embodiment of a system 10 configured to allocate demands of a network according to demand weight. In particular embodiments, system 10 allocates the demands according to location weights (LWs) and connectivity weights (CWs). This allocation technique aggregates more interconnected demands into rings without disconnecting the demand graph, which may maximize optical line card sharing and reduce the total number of optical line cards needed by the network.

In particular embodiments, system 10 allocates demand for a communication network that allows components, such as nodes, to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

In particular embodiments, a communication network communicates information through signals such as optical signals. In particular embodiments, a communication network includes one or more ring networks. According to one embodiment, a ring network may utilize protocols such as Resilient Packet Ring (RPR) protocols, according to which packets are added, passed through, or dropped at network nodes. A ring network may utilize any suitable transmission technique, such as time division multiplexing (TDM) or wavelength division multiplexing (WDM) techniques.

In particular embodiments, a communication network includes network nodes. Network nodes may include any suitable device configured to route packets through, to, or from a communication network. Examples of network elements include routers, switches, wavelength division multiplexers (WDMs), access gateways, endpoints, softswitch servers, trunk gateways, access service providers, Internet service providers, or a network management system.

In the illustrated embodiment, system 10 includes one or more interfaces 20, logic 22, and one or more memories 24. Logic 22 includes one or more processors 30, a graph generator 32, a weight calculator 34, and a demand allocator 36. In particular embodiments, graph generator 32 generates a graph representing a network for which demands may be allocated. The graph describes the demands of the system. In particular embodiments, a weight calculator 34 calculates weights for the demands using the graph and adds the weights to the graph. Examples of weights calculated by weight calculator 34 are described in more detail with reference to FIGS. 2 and 3. In particular embodiments, a demand allocator 36 allocates demands using the graph. Examples of demand allocation are described with reference to FIGS. 4 through 7B.

In particular embodiments, system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as processor 30, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 2:
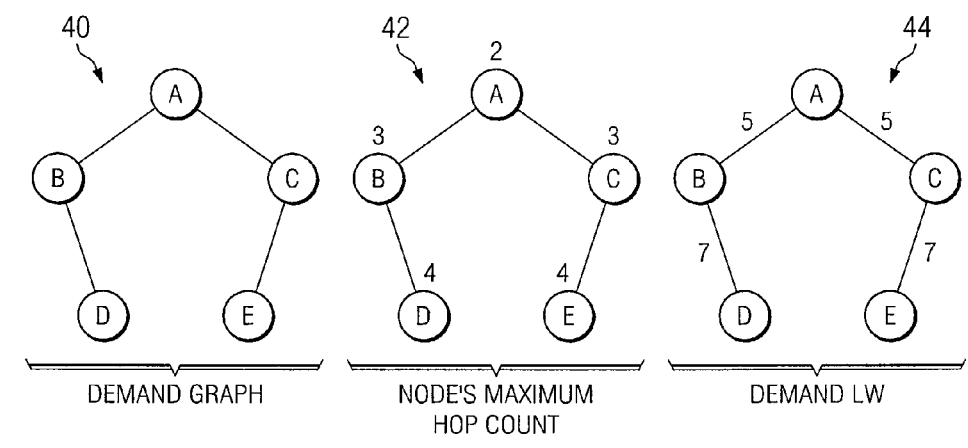
FIG. 2 illustrates an example of a method for calculating the location weight of a demand.

FIG. 2 illustrates an example of a method for calculating the location weight of a demand. Location weight of a demand indicates the demand's relative location on the demand graph. A demand located at the edge of the demand graph has the highest location weight. The removal of such a demand does not disconnect other demands.

According to the method, a demand graph is received at step 40. In the example, the demand graph includes nodes A, B, C, D, and E and demands A-B, A-C, B-D, and C-E. The maximum hop count from each node to other nodes on the demand graph is calculated at step 42. The maximum hop count for a node may be the maximum number of hops from that node to any other node of the graph. In the example, node A can reach any other node in a maximum of 2 hops, so node A's maximum hop count is 2. Node B's maximum hop count is 3.

The location weight for each demand is calculated at step 44. The location weight for a demand may be a function of, such as the sum of, the maximum hop counts of the source and destination nodes (the source and destination maximum hop counts) of the demand. In the example, the location weight for demand A-B is the sum of the maximum hop count of node A and the maximum hop count of node B, which is 2+3=5.

Figure 3:
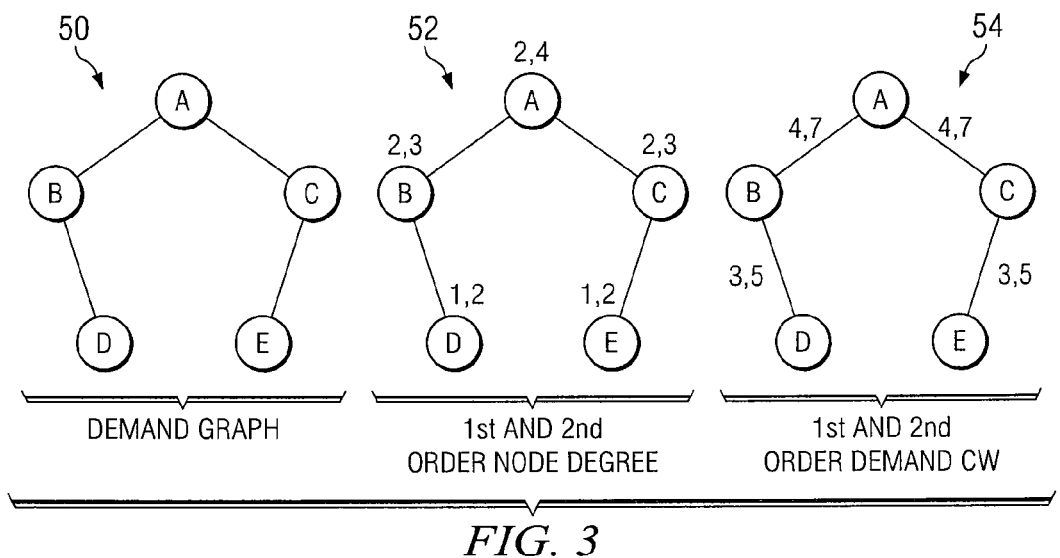
FIG. 3 illustrates an example of a method for calculating the connectivity weight of a demand.

FIG. 3 illustrates an example of a method for calculating the connectivity weight of a demand. The connectivity weight of a demand indicates the connectivity of the demand to other demands on the demand graph. A demand with a higher connectivity weight has better interconnectivity with other demands, and therefore has a higher probability of optical line card sharing.

According to the method, a demand graph is received at step 50. In the example, the demand graph includes nodes A, B, C, D, and E and demands A-B, A-C, B-D, and C-E. Node connectivity of the 1st and 2nd (or more) order is calculated at step 52. For example, the 1st and 2nd order node degree may be calculated. The nth order node degree of a node is the number of nodes to which the (n−1)th order nodes of the node are connected. The 1st order node degree of a node is the number of nodes to which the node is connected. In the example, node A is connected to 2 nodes, so node A's 1st order node degree is 2. The 2nd order node degree of a node is the number of nodes to which the 1st order nodes of the node are connected. In the example, node A is connected to nodes B and C. Nodes B and C are each connected to 2 nodes, so the 2nd order node degree of node A is 2+2=4.

The connectivity weight of each demand is calculated at step 54. The connectivity weight for a demand may have the same number of orders as the node connectivity, and a particular order node degree of the connectivity weight may be a function of, such as the sum of, that order node degree of the source and destination nodes (the source and destination order node degrees) of the demand. For example, the 1st order node degree of the connectivity weight may be the sum of the 1st order node degrees of the source and destination nodes of the demand. In the example, node A's 1st and 2nd order node degree are 2 and 4, respectively, and node B's 1st and 2nd order node degree are 2 and 3, respectively. Accordingly, then demand A-B's 1st order and 2nd order connectivity weight are 4 and 7, respectively. In other examples, higher order weights may be calculated.

Figure 4:
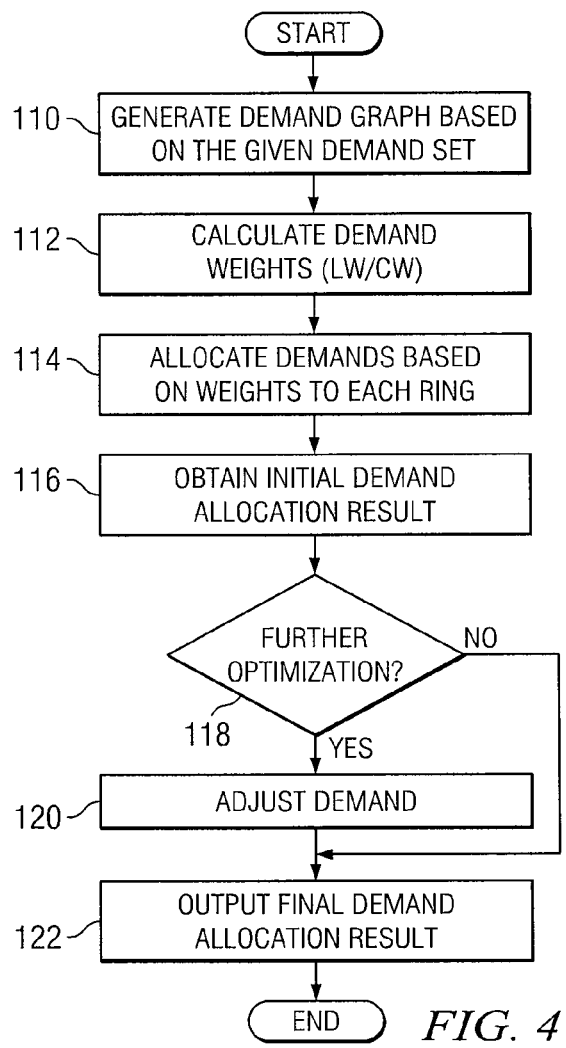
FIGS. 4 and 5 illustrate an example of a method for allocating demand to optimize optical line card sharing.
Figure 5:
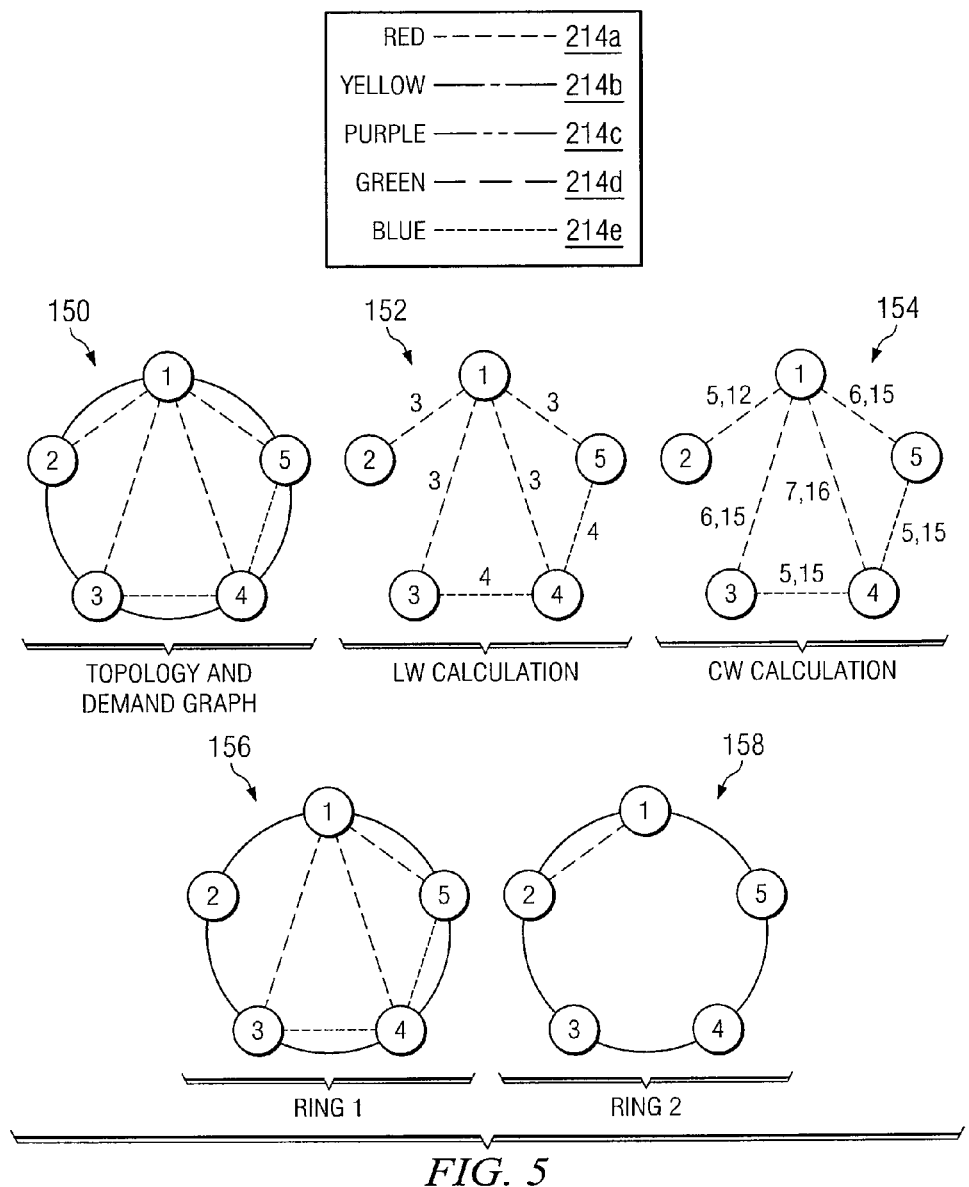

FIGS. 4 and 5 illustrate an example of a method for allocating demand to optimize optical line card sharing. In the example, a network with a capacity of Optical Carrier 192 (OC-192) has five nodes (nodes 1, 2, 3, 4, and 5). The Unidirectional Path-Switched Ring (UPSR) demand (DM) set is:

OC-48: 1-2, 1-3, 1-4, 1-5
OC-12: 3-4, 4-5

The method starts at step 110, where a demand graph 150 is generated based on the demand set. Demand weights are calculated at step 112. The demand weights may include location weights 152 and connectivity weights 154 calculated as described above. TABLE 1 illustrates examples of location weights (LWs) and connectivity weights (CWs) for demand graph 150.

TABLE 1

| DM | Type | LW | CW |
|---|---|---|---|
| 3-4 | OC-12 | 4 | 5, 15 |
| 4-5 | OC-12 | 4 | 5, 15 |
| 1-2 | OC-48 | 3 | 5, 12 |
| 1-3 | OC-48 | 3 | 6, 15 |
| 1-5 | OC-48 | 3 | 6, 15 |
| 1-4 | OC-48 | 3 | 7, 16 |

Demand is allocated according to the weights at step 114. The demand may be allocated in any suitable manner. In particular embodiments, an initial demand may be allocated by determining one or more demands with the highest location weights. From the one or more demands, a demand with the highest connectivity weight is allocated.

In particular embodiments, a subsequent demand may be allocated by selecting one or more demands that share the most nodes with allocated demands, have the highest location weight and lowest connectivity weight, and/or satisfy constraints. Examples of constraints include bandwidth/port constraints and impact to the remaining demand graph. If multiple such demands exit, the demand that results in least number of nodes in the remaining demand graph may be allocated. If a demand cannot fit in the current ring, a new ring may be generated and another initial demand may be allocated. When the demands of the demand graph have been allocated, an initial ring allocation result is output. TABLE 2 illustrates an example of demand allocation for rings 156 and 158.

TABLE 2

| Order | DM | Note |
|---|---|---|
| 1 | 3-4 | Demand with maximum LW and CW |
| 2 | 4-5 | Maximum node sharing (node 4) with maximum LW and minimum CW |
| 3 | 1-3 | Maximum node sharing (node 3) with maximum LW and minimum CW |
| 4 | 1-5 | Maximum node sharing (nodes 1 and 5) with maximum LW and minimum CW |
| 5 | 1-4 | Maximum node sharing (nodes 1 and 4) with maximum LW and minimum CW |
| 6 | 1-2 | Exceeds capacity. Form new ring. |

Further optimization may be performed at step 118. If further optimization is to be performed, the method proceeds to step 120, where demand is adjusted. Demand may be adjusted in any suitable manner. For example, demands may be moved and/or exchange among rings, demands may be removed from rings to reform rings, or demands may be adjusted in any other suitable manner. Examples of demand adjustment are described with reference to FIGS. 7A and 7B. Step 120 may be repeated any suitable number of times. The final allocation result is output at step 122. The method then ends.

Figure 6A:
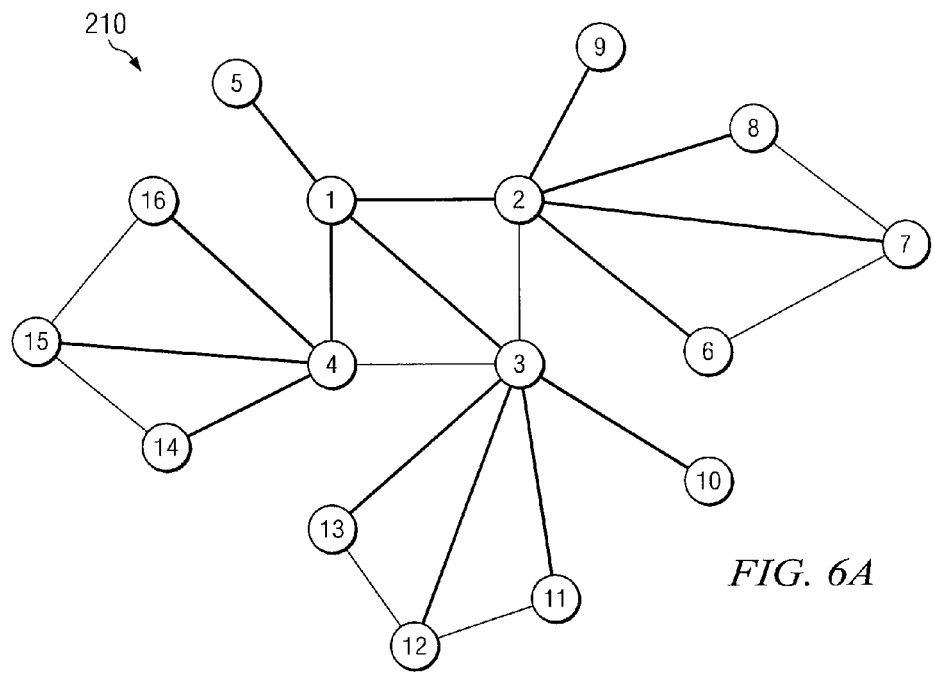
FIGS. 6A through 6F illustrate another example of a method for allocating demand to optimize optical line card sharing.

FIGS. 6A through 6F illustrate another example of a method for allocating demand to optimize optical line card sharing. FIG. 6A illustrates an example of a graph 210 representing a network with a capacity of Optical Carrier 192 (OC-192). Graph 210 has sixteen nodes (nodes 1, 2, ..., 16) and demands:

OC-12: 2-3, 3-4, 6-7, 7-8, 11-12, 12-13, 14-15, 15-16;
OC-48: 1-2, 1-3, 1-4, 1-5, 2-6, 2-7, 2-8, 2-9, 3-10, 3-11, 3-12, 3-13, 4-14, 4-15, 4-16.

Figure 6B:
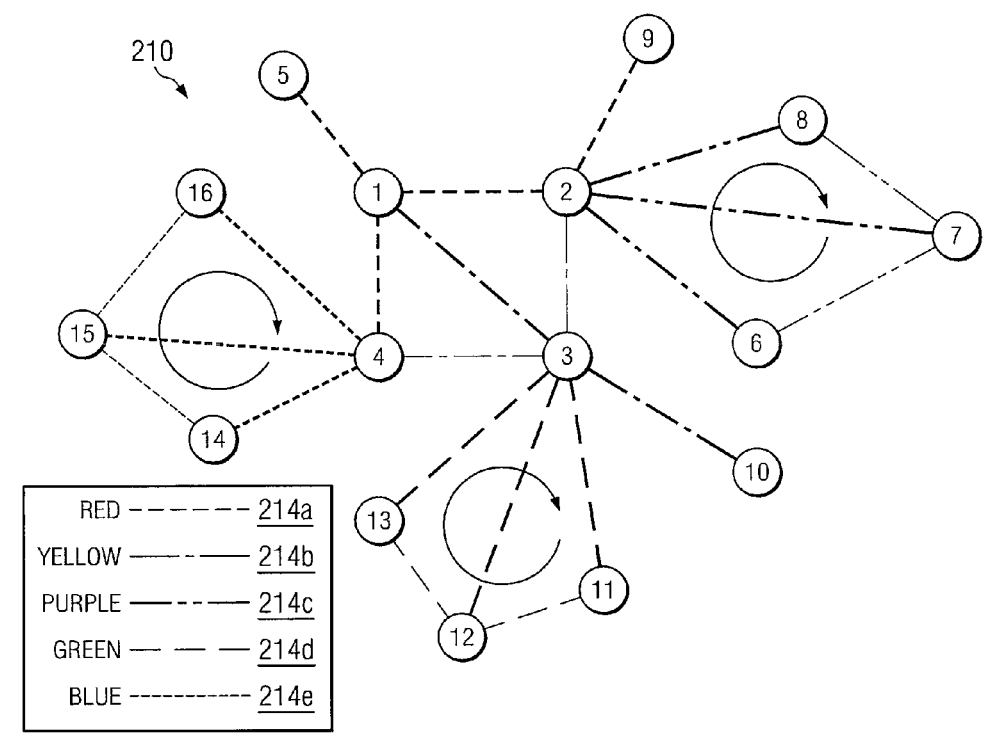
Figure 6C:
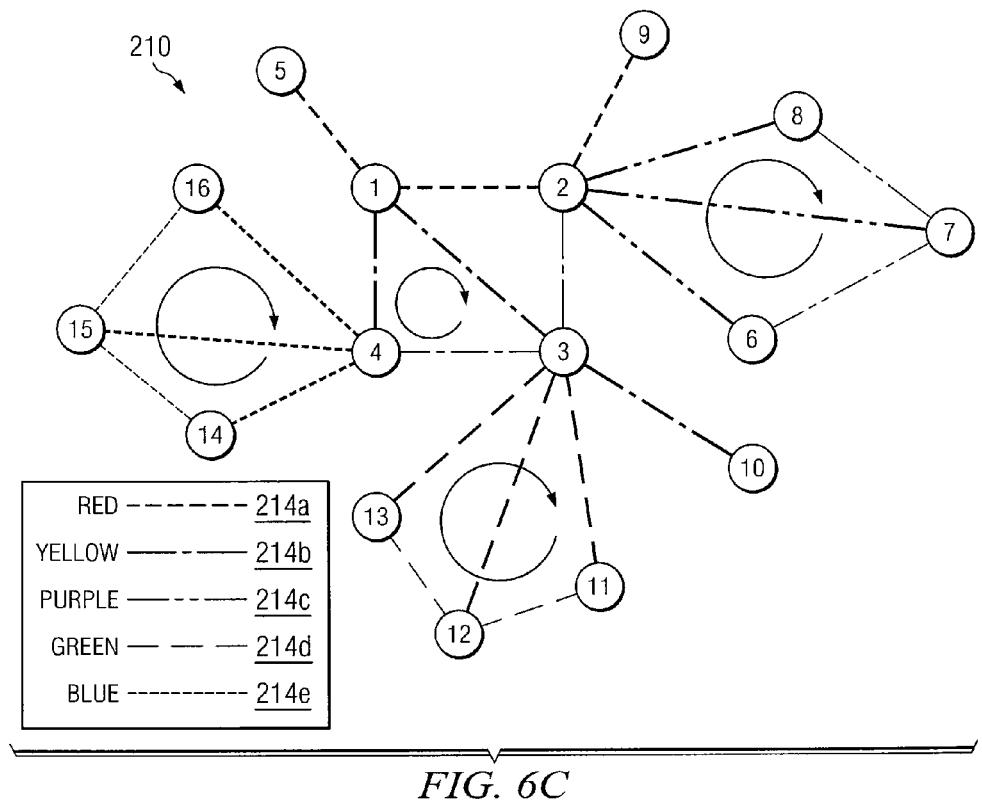

FIG. 6B illustrates an initial allocation of demands. Interconnected demands are aggregated into rings according to a weight-based algorithm. In this initial result, there are 44 optical line cards and five rings 214(a, b, ..., e). FIG. 6C illustrates a next allocation of demands. The weight-based algorithm may be used to reduce the number of optical line cards to 42.

Figure 6D:
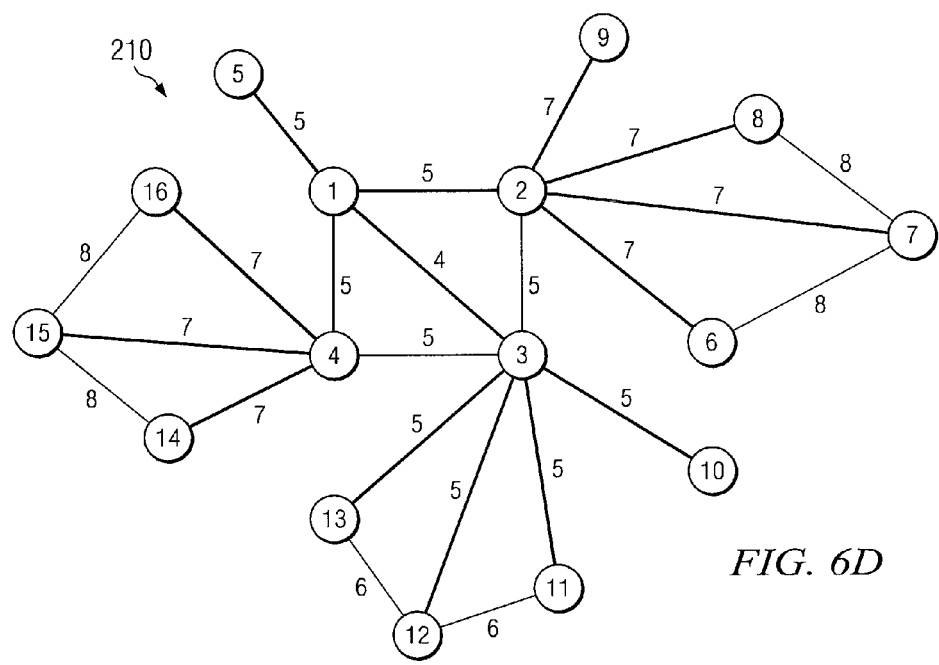
Figure 6E:
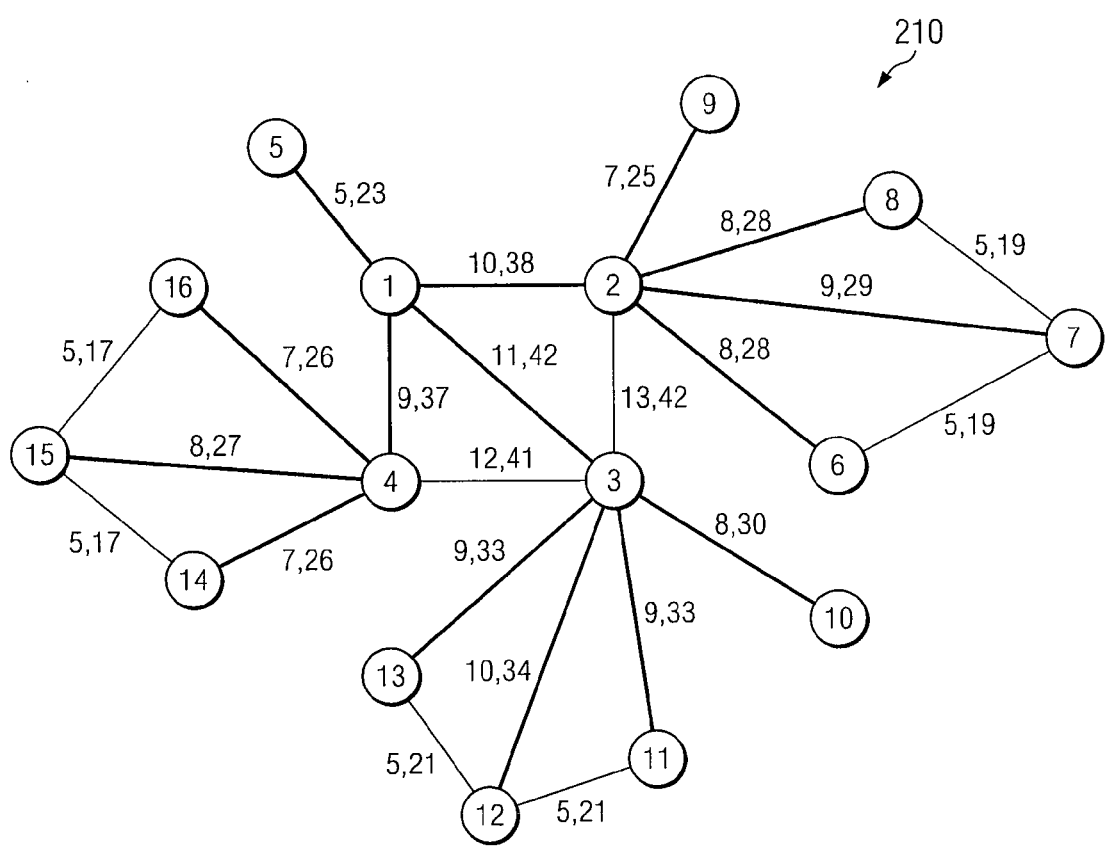

FIG. 6D illustrates location weights calculated for graph 210. FIG. 6E illustrates connectivity weights calculated for graph 210. TABLE 3 lists the demands and their location weights and connectivity weights.

TABLE 3

| DM | Type | LW | CW |
|---|---|---|---|
| 15-14 | OC-12 | 8 | 5, 17 |
| 15-16 | OC-12 | 8 | 5, 17 |
| 6-7 | OC-12 | 8 | 5, 19 |
| 7-8 | OC-12 | 8 | 5, 19 |
| 2-9 | OC-48 | 7 | 7, 25 |
| 4-16 | OC-48 | 7 | 7, 26 |
| 4-14 | OC-48 | 7 | 7, 26 |
| 2-6 | OC-48 | 7 | 8, 19 |
| 2-8 | OC-48 | 7 | 8, 19 |
| 4-15 | OC-48 | 7 | 8, 27 |
| 2-7 | OC-48 | 7 | 9, 29 |
| 11-12 | OC-12 | 6 | 5, 21 |
| 12-13 | OC-12 | 6 | 5, 21 |
| 1-5 | OC-48 | 5 | 5, 23 |
| 3-10 | OC-48 | 5 | 8, 30 |
| 3-11 | OC-48 | 5 | 9, 33 |
| 3-13 | OC-48 | 5 | 9, 33 |

TABLE 3-continued

| DM | Type | LW | CW |
|---|---|---|---|
| 1-4 | OC-48 | 5 | 9, 37 |
| 3-12 | OC-48 | 5 | 10, 34 |
| 1-2 | OC-48 | 5 | 10, 38 |
| 3-4 | OC-12 | 5 | 12, 41 |
| 2-3 | OC-12 | 5 | 13, 42 |
| 1-3 | OC-48 | 4 | 11, 42 |

Figure 6F:
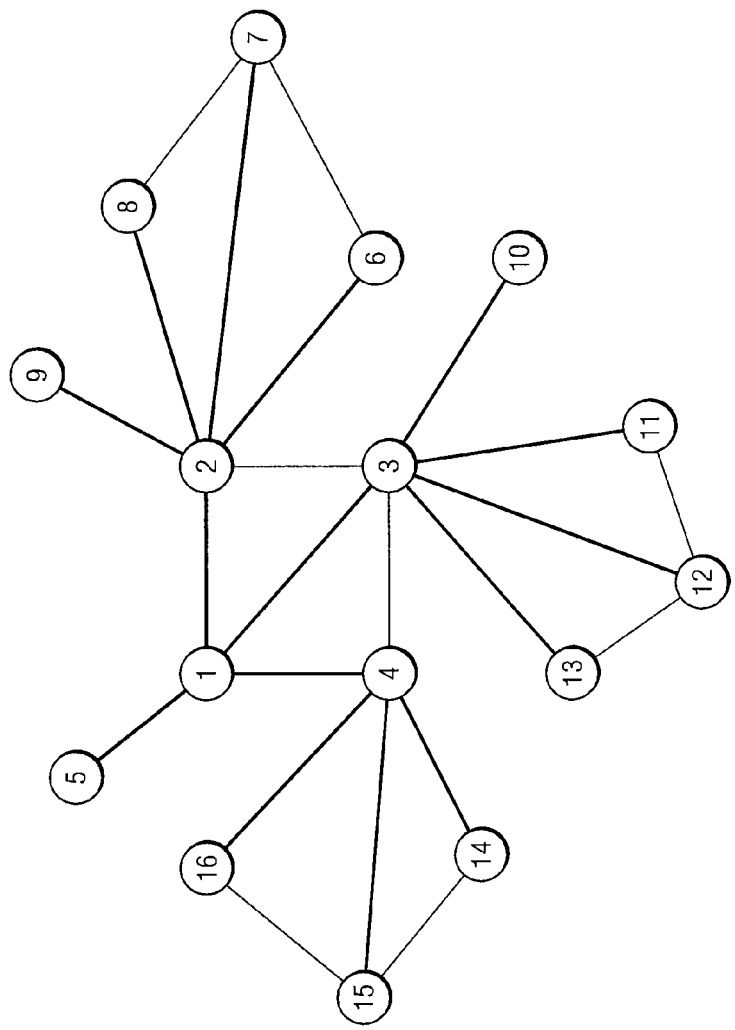
Figure 6F:
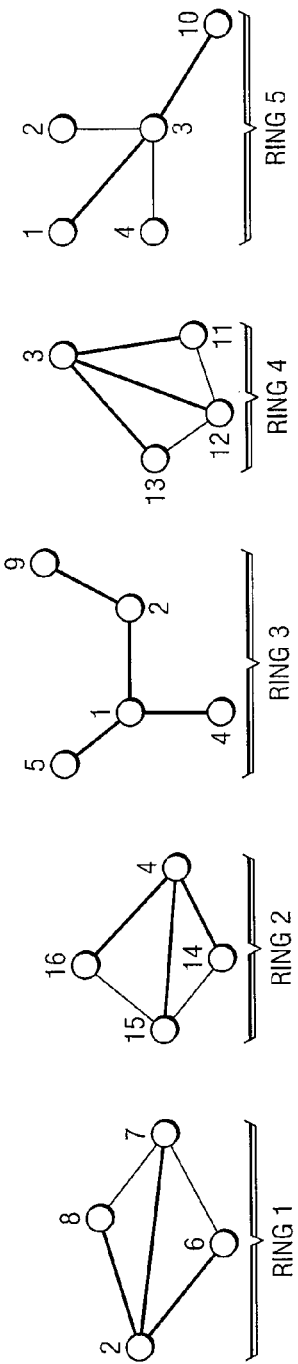

FIG. 6F illustrates rings into which demand can be allocated. In the example, rings include Rings 1 through 5. TABLE 4 describes the demand allocation.

TABLE 4

| No. | DM | Note |
|---|---|---|
| 1 | 6-7 | First demand with highest LW and highest CW |
| 2 | 7-8 | Maximum node sharing, highest LW, and lowest CW |
| 3 | 2-6 | Maximum node sharing, highest LW, and lowest CW |
| 4 | 2-8 | Maximum node sharing, highest LW, and lowest CW |
| 5 | 2-7 | Maximum node sharing, highest LW, and lowest CW |
| | 2-9 | No bandwidth available. Finish this ring |
| 6 | 14-15 | New ring. First demand with highest LW and highest CW for this ring |
| 7 | 15-16 | Maximum node sharing, highest LW, and lowest CW |
| 8 | 4-14 | Maximum node sharing, highest LW, and lowest CW |
| 9 | 4-16 | Maximum node sharing, highest LW, and lowest CW |
| 10 | 4-15 | Maximum node sharing, highest LW, and lowest CW |
| | 1-4 | No bandwidth available. Finish this ring |
| 11 | 2-9 | New ring. First demand with highest LW and highest CW for this ring |
| 12 | 1-2 | Maximum node sharing, highest LW, and lowest CW |
| 13 | 1-5 | Maximum node sharing, highest LW, and lowest CW |
| 14 | 1-4 | Maximum node sharing, highest LW, and lowest CW |
| | 3-4 | No bandwidth available. Finish this ring |
| 15 | 11-12 | New ring. First demand with highest LW and highest CW for this ring |
| 16 | 12-13 | Maximum node sharing, highest LW, and lowest CW |
| 17 | 3-11 | Maximum node sharing, highest LW, and lowest CW |
| 18 | 3-13 | Maximum node sharing, highest LW, and lowest CW |
| 19 | 3-12 | Maximum node sharing, highest LW, and lowest CW |
| | 3-10 | No bandwidth available. Finish this ring |
| 20 | 3-10 | New ring. First demand with highest LW and highest CW for this ring |
| 21 | 3-4 | Maximum node sharing, highest LW, and lowest CW |
| 22 | 2-3 | Maximum node sharing, highest LW, and lowest CW |
| 23 | 1-3 | Maximum node sharing, highest LW, and lowest CW |
| | | No demand left. Finish initial ring allocation |

Figure 7A:
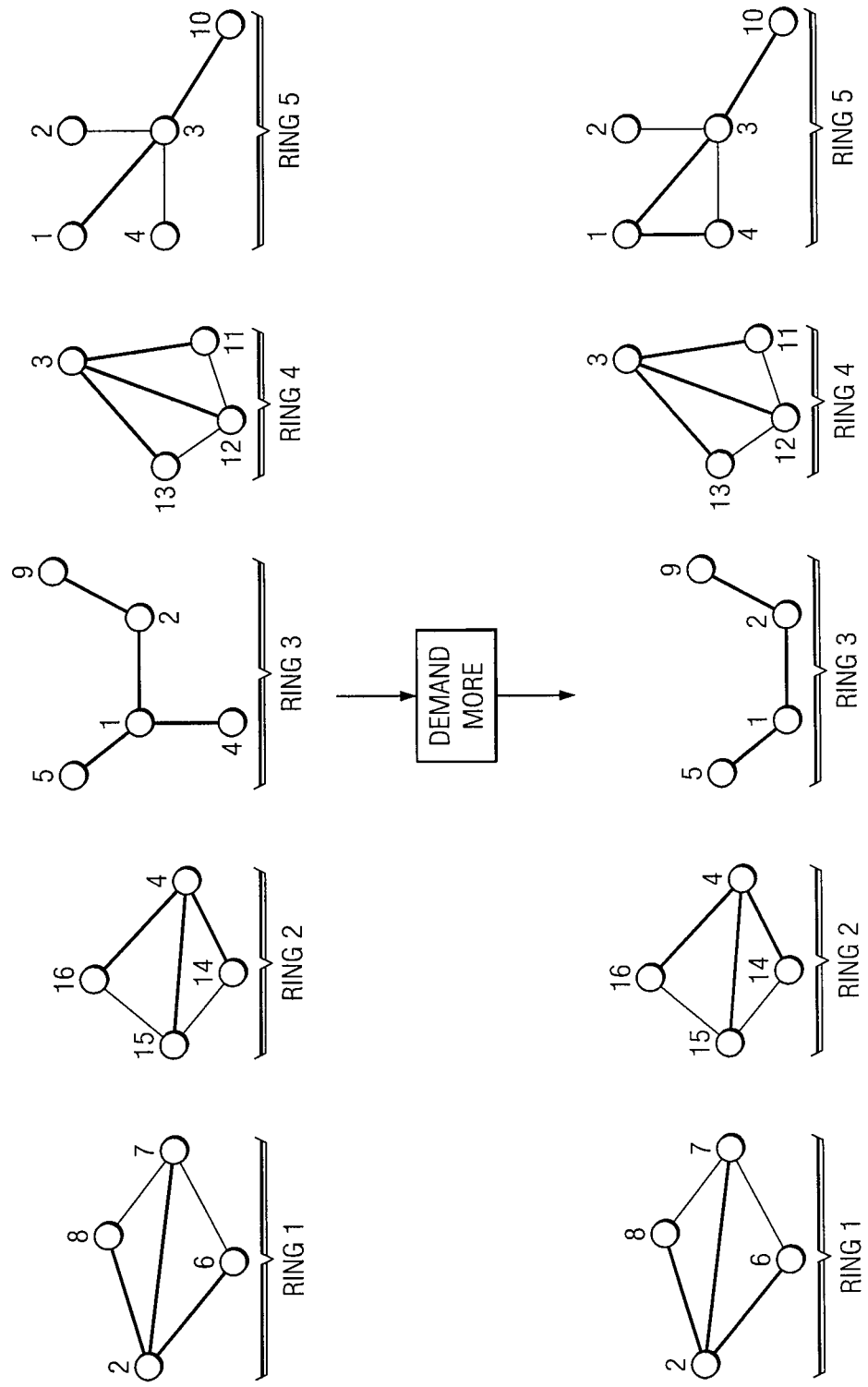
FIGS. 7A and 7B illustrate an example of demand adjustment.
Figure 7B:
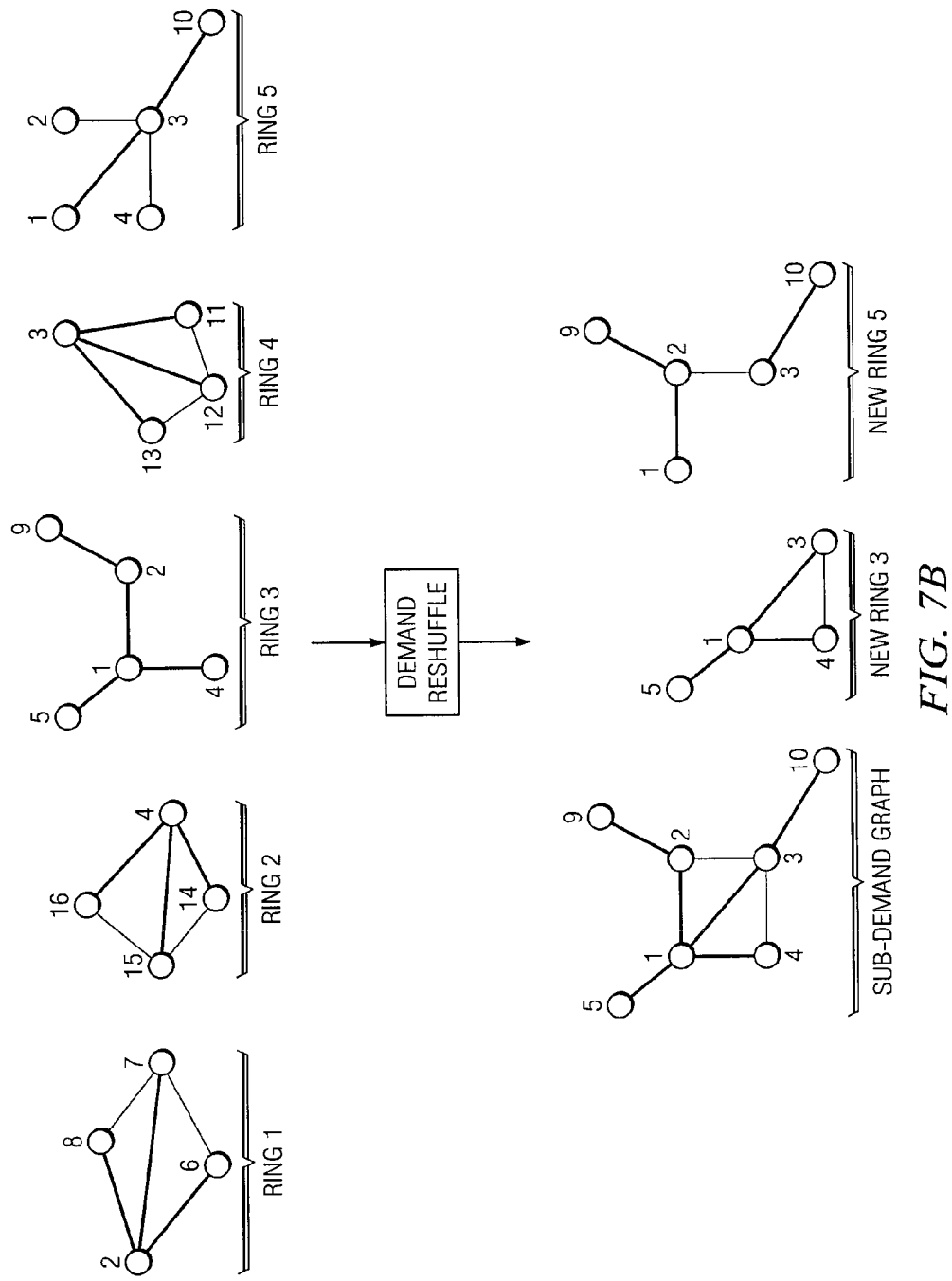

FIGS. 7A and 7B illustrate an example of demand adjustment. In certain embodiments, demand may be adjusted to further optimize the results. Demand adjustment may include demand move/exchange and demand reshuffle. Demand move/exchange moves and/or exchanges one or more demands among rings. Demand reshuffle removes one or more demands from rings to form a sub-demand graph that may yield new rings. After demand adjustment, the demands are reallocated to see if there is improvement.

FIG. 7A illustrates an example of a demand move. In the initial demand allocation, there are 44 optical line cards and five rings. Ring 5 is not full. Demand 1-4 may be moved from Ring 3 to Ring 5. After demand adjustment, there are 42 optical line cards and five rings.

FIG. 7B illustrates an example of a demand reshuffle. In the initial demand allocation, there are 44 optical line cards and five rings. Demands are removed from Ring 3 and Ring 5 to form a sub-demand graph. The sub-demand graph yields a new Ring 3 and new Ring 5, which use fewer optical line cards. After demand adjustment, there are 42 optical line cards and five rings.

Modifications, additions, or omissions may be made to the systems described herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method comprising:
   receiving a demand graph describing a plurality of demands of a network;
   calculating, using a processor of a computer, one or more weights for each demand, the calculating the one or more weights comprising performing the following for each demand:
      performing the following for each order of one or more orders:
         determining a source node degree of the each order for the source node of the each demand;
         determining a destination node degree of the each order for the destination node of the each demand; and
      performing a function on the source node degree and the destination node degree to yield a connectivity weight of the each order; and
      collecting the connectivity weight of the one or more orders to yield a connectivity weight for the each demand; and
   allocating, using the processor of the computer, the demands to one or more rings of the network according to the weights of the demands.

2. The method of claim 1, the allocating the demands further comprising:
   allocating the demands according to the weights of the demands to optimize optical line card sharing.

3. The method of claim 1, the calculating the one or more weights further comprising:
   calculating a location weight and a connectivity weight for each demand, where the location weight of each demand indicates the location of the each demand on the demand graph and the connectivity weight of each demand indicates the connectivity of the each demand to the other demands described in the demand graph.

4. The method of claim 1, the calculating the one or more weights further comprising performing the following for each demand:
   determining a source maximum hop count for the source node of the each demand;
   determining a destination maximum hop count for the destination node of the each demand; and
   performing a function on the source maximum hop count and the destination maximum hop count to yield a location weight for the each demand.

5. The method of claim 1, the allocating the demands further comprising, for an initial demand:
   identifying one or more demands with one or more highest location weights; and
   allocating an identified demand with a highest connectivity weight.

6. The method of claim 1, the allocating the demands further comprising, for a subsequent demand:
   selecting a demand that satisfies at least one of the following:
      shares the most nodes with allocated demands;
      has a highest location weight and a lowest connectivity weight; and
      satisfies one or more constraints.

7. The method of claim 1, further comprising:
   moving an allocated demand from a first ring to a second ring of the one or more rings; and
   allocating the demands again to determine whether optical line card sharing has been optimized.

8. The method of claim 1, further comprising:
   removing one or more allocated demands from a first ring and a second ring to form a sub-demand graph that yields a first new ring and a second new ring; and
   allocating the demands again to determine whether optical line card sharing has been optimized.

9. An apparatus comprising:
   one or more processors; and
   one or more memories storing logic configured to, when executed by the one or more processors:
      receive a demand graph describing a plurality of demands of a network;
      calculate one or more weights for each demand, the calculating the one or more weights comprising performing the following for each demand:
         performing the following for each order of one or more orders:
            determining a source node degree of the each order for the source node of the each demand;
            determining a destination node degree of the each order for the destination node of the each demand; and
         performing a function on the source node degree and the destination node degree to yield a connectivity weight of the each order; and
         collecting the connectivity weight of the one or more orders to yield a connectivity weight for the each demand; and
      allocate the demands to one or more rings of the network according to the weights of the demands.

10. The apparatus of claim 9, the one or more processors configured to allocate the demands by:
    allocating the demands according to the weights of the demands to optimize optical line card sharing.

11. The apparatus of claim 9, the one or more processors configured to calculate the one or more weights by:
    calculating a location weight and a connectivity weight for each demand, where the location weight of each demand indicates the location of the each demand on the demand graph and the connectivity weight of each demand indicates the connectivity of the each demand to the other demands described in the demand graph.

12. The apparatus of claim 9, the one or more processors configured to calculate the one or more weights by performing the following for each demand:
    determining a source maximum hop count for a source node of the each demand;

determining a destination maximum hop count for a destination node of the each demand; and performing a function on the source maximum hop count and the destination maximum hop count to yield a location weight for the each demand.

13. The apparatus of claim 9, the one or more processors configured to allocate the demands by, for an initial demand:

identifying one or more demands with one or more highest location weights; and allocating an identified demand with a highest connectivity weight.

14. The apparatus of claim 9, the one or more processors configured to allocate the demands by, for a subsequent demand:

selecting a demand that satisfies at least one of the following:

shares the most nodes with allocated demands;

has a highest location weight and a lowest connectivity weight; and satisfies one or more constraints.

15. The apparatus of claim 9, the one or more processors configured to:

move an allocated demand from a first ring to a second ring of the one or more rings; and allocate the demands again to determine whether optical line card sharing has been optimized.

16. The apparatus of claim 9, the one or more processors configured to:

remove one or more allocated demands from a first ring and a second ring to form a sub-demand graph that yields a first new ring and a second new ring; and allocate the demands again to determine whether optical line card sharing has been optimized.

17. An apparatus comprising:

one or more processors; and one or more memories storing logic configured to, when executed by the one or more processors:

receive a demand graph describing a plurality of demands of a network;

calculate a location weight and a connectivity weight for each demand, where the location weight of each demand indicates the location of the each demand on the demand graph and the connectivity weight of each demand indicates the connectivity of the each demand to the other demands described in the demand graph, the calculating of the connectivity weight for the each demand comprising:

performing the following for each order of one or more orders:

determining a source node degree of the each order for a source node of the each demand;

determining a destination node degree of the each order for a destination node of the each demand; and performing a function on the source node degree and the destination node degree to yield a connectivity weight of the each order; and collecting the connectivity weight of the one or more orders to yield the connectivity weight for the each demand; and allocate the demands to one or more rings of the network according to the weights of the demands to optimize optical line card sharing.

18. The apparatus of claim 17, the one or more processors configured to calculate the location weight for each demand by:

determining a source maximum hop count for a source node of the each demand;

determining a destination maximum hop count for a destination node of the each demand; and performing a function on the source maximum hop count and the destination maximum hop count to yield the location weight for the each demand.

* * * * *